July 3, 1923.
F. A. BANNON
1,460,695
LUBRICATING, CLEANING, AND PAINTING APPARATUS
Filed Dec. 2, 1921    3 Sheets-Sheet 3
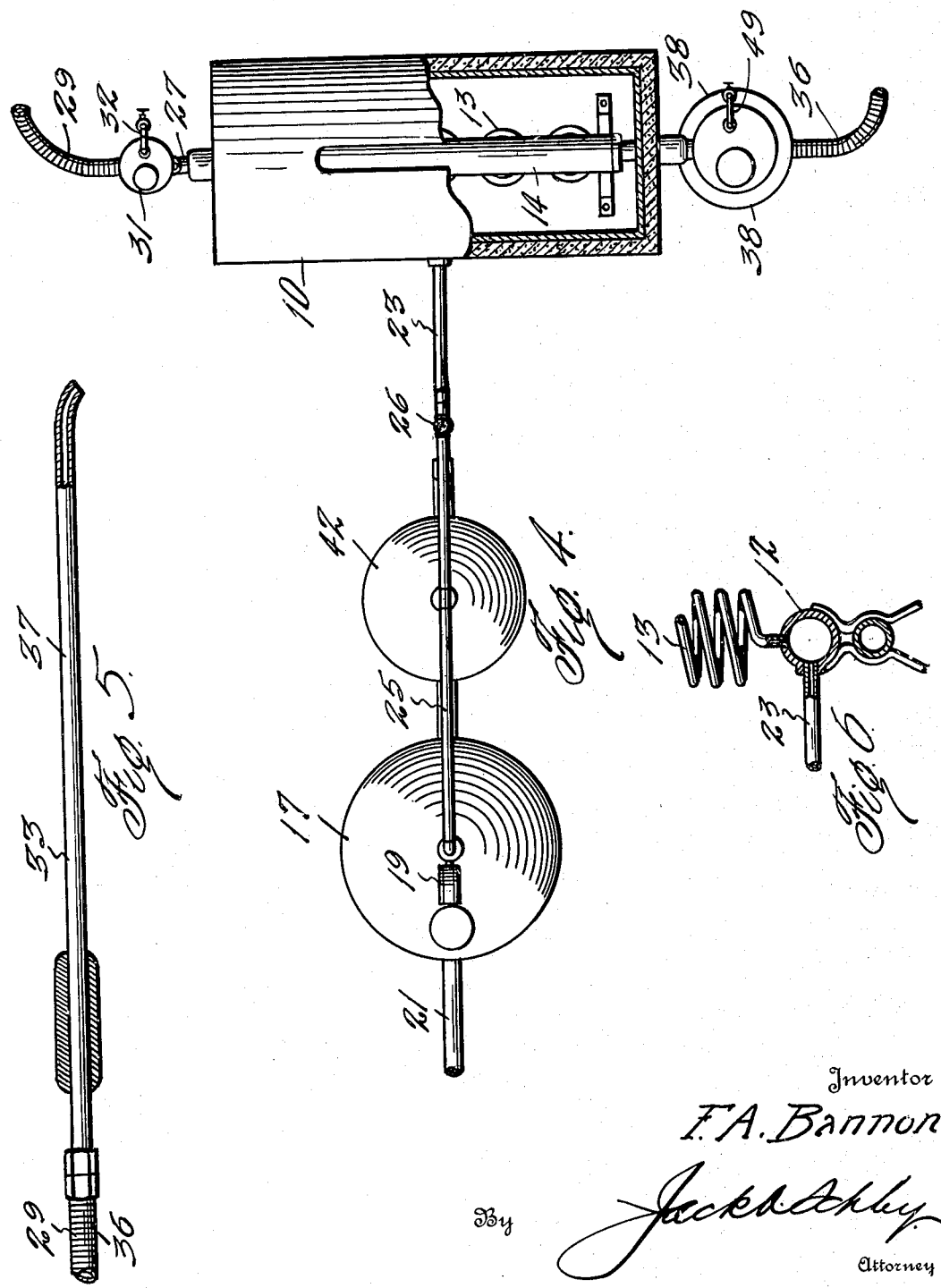
Inventor
F. A. Bannon
By Jack A. Ashley
Attorney Patented July 3, 1923.

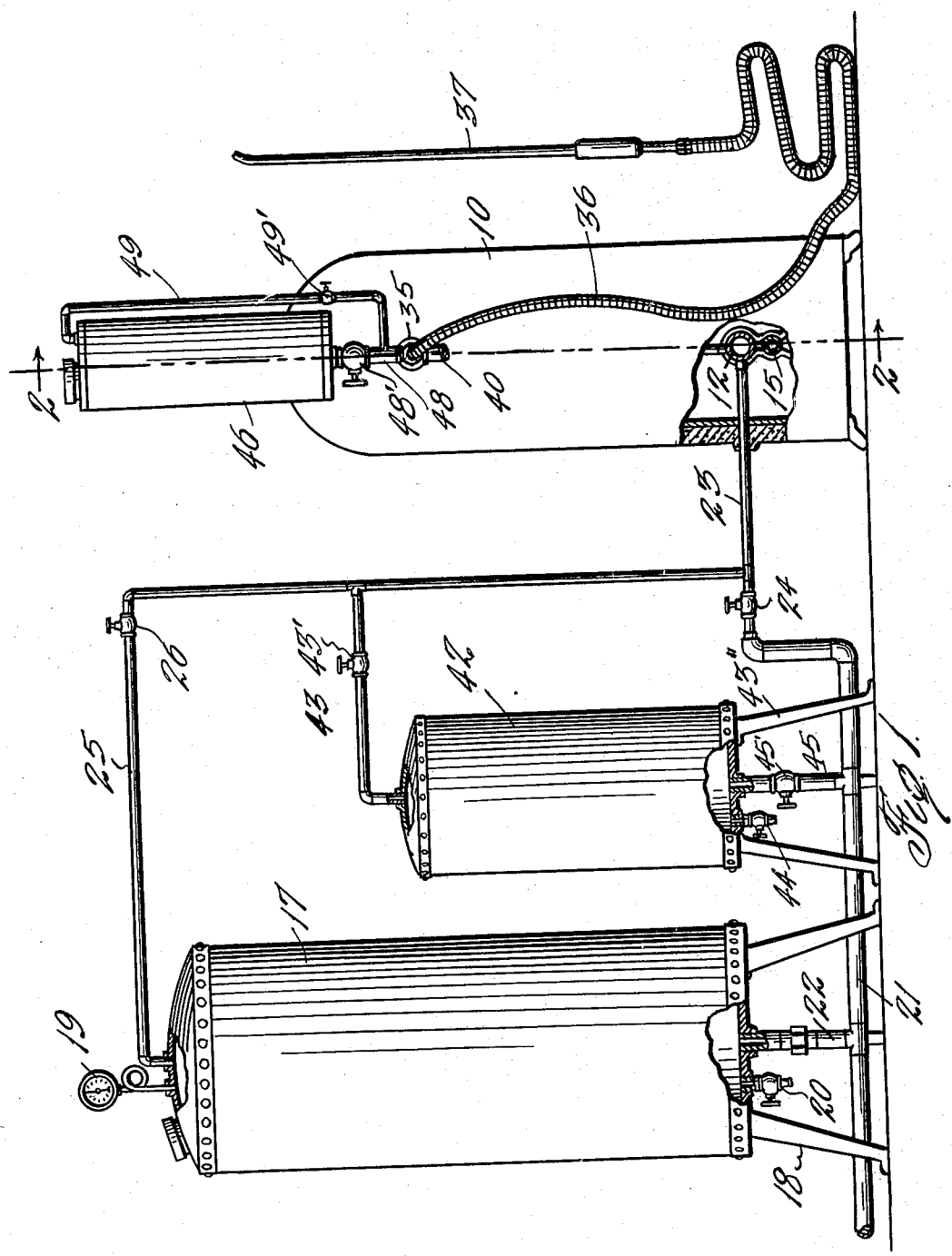

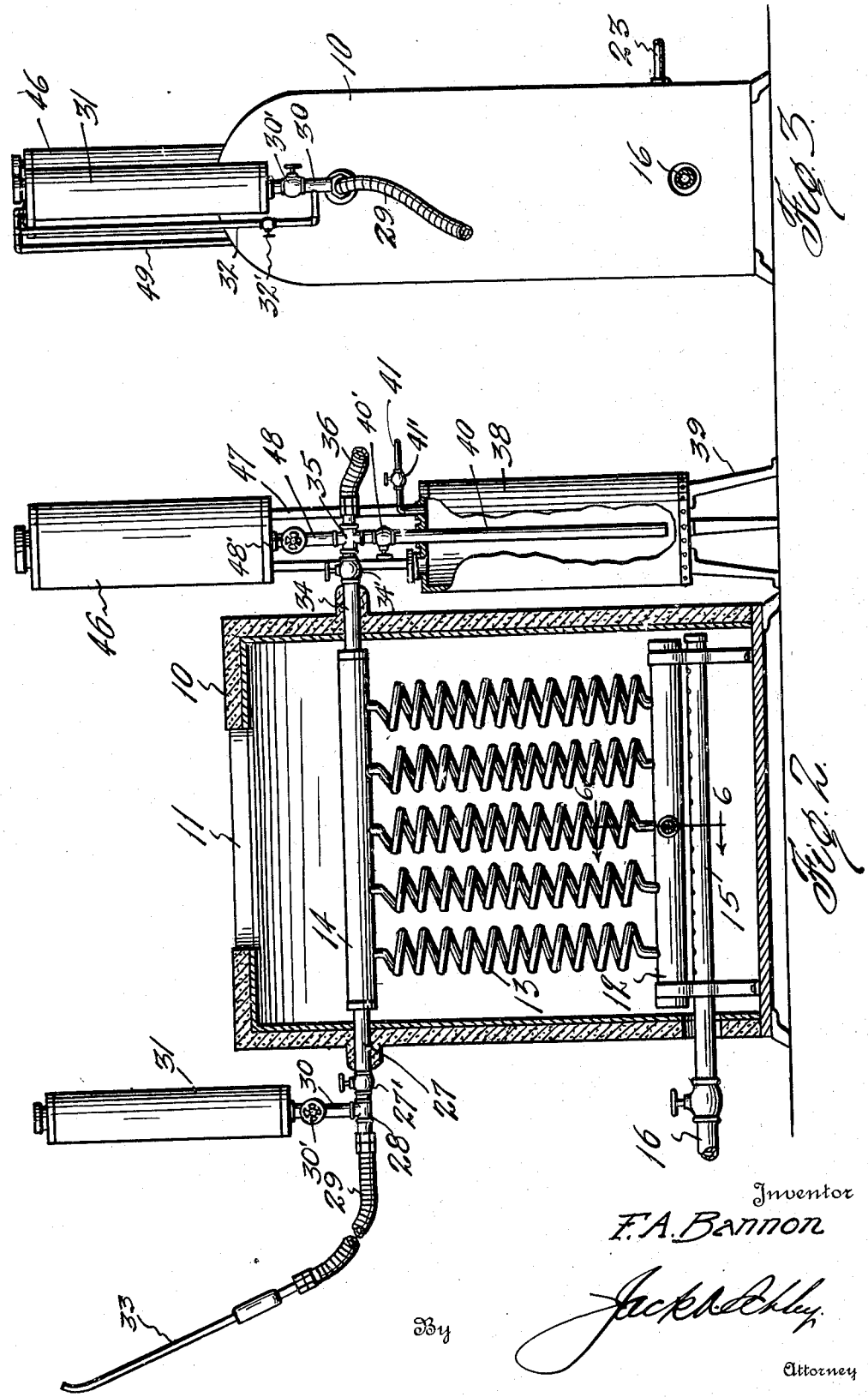

1,460,695

UNITED STATES PATENT OFFICE.

FRANK A. BANNON, OF DALLAS, TEXAS, ASSIGNOR, BY DIRECT AND MESNE ASSIGNMENTS, OF TWO-THIRDS TO RIDGELL KELLER AND ONE-THIRD TO W. A. THORNTON, BOTH OF DALLAS, TEXAS.

LUBRICATING, CLEANING, AND PAINTING APPARATUS.

Application filed December 2, 1921. Serial No. 519,567.

*To all whom it may concern:*

Be it known that I, FRANK A. BANNON, a citizen of the United States, residing at Dallas, in the county of Dallas and State of Texas, have invented certain new and useful Improvements in Lubricating, Cleaning, and Painting Apparatus, of which the following is a specification.

This invention relates to new and useful improvements in lubricating, cleaning and painting apparatus.

The object of the invention is to provide an apparatus capable of carrying out the various operations and functions incidental to the cleaning, lubricating and painting of motor vehicles and other objects and surfaces; and also including as incidental to the painting the removal of paint from surfaces which are to be repainted. One of the principal objects of the invention is to include a heating or generating element which is associated with the various parts in such a way as to produce steam or gaseous vapors which may be impregnated with detergents, lubricants or other chemicals.

An important object is that an apparatus of this character provides a unit which may be adjusted and controlled to perform the functions of several machines, thus reducing the initial investment and making for economy as well as efficiency and the saving of time in carrying out the work.

In carrying out the invention a heating and generating element is provided and connected with a suitable water supply pipe, whereby water may be introduced to generate steam. Means is provided for also introducing into the heating element various liquids, the supply of which may be controlled to a minute degree. Various receptacles are connected with the heating element and the discharge lines in such a manner as to introduce the desired ingredient into the discharge lines as well as to use steam pressure for such introduction. Various other advantages will be hereinafter pointed out.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a side elevation of an apparatus constructed in accordance with my invention, Fig. 2 is a view showing the heating element in vertical section on the line 2—2 of Fig. 1 and illustrating the associated receptacles in elevation, Fig. 3 is an end elevation of these parts, Fig. 4 is a plan view, a portion of the heating receptacle being in section, Fig. 5 is a detail of the nozzle, and Fig. 6 is a detail of the heating coil structure.

In the drawings the numeral 10 designates a vertical housing having an outlet 11 in its top which is preferably rounded. The housing is suitably constructed so as to retain the heat therein and is supported slightly above the floor. This housing has a general rectangular shape and extends vertically. In the lower portion of the housing a manifold 12 is provided and connected with vertical coils 13 which enter a cross head 14 at their upper ends. A burner 15 is disposed under the manifold and is connected with a gas supply pipe 16 whereby the heating element formed by the parts 12, 13 and 14, may be heated.

Spaced from the casing is an upright tank 17 suitably supported on legs 18 and having a pressure gauge 19 connected to its top. A drain valve 20 is connected in the bottom of the receptacle for cleaning the same. A water service pipe 21 passes under the tank and is connected therewith by a branch pipe 22. The service pipe is connected with a reduced feed pipe 23 which enters the manifold 12. A valve 24 is connected in said pipe 23. A small pipe 25 extends from the top of the tank 17 and includes a valve 26. This pipe is turned downwardly and connected with the feed pipe 23 between the manifold and the valve 24. The tank 17 is adapted to contain coal oil or any other ingredient which is desired. The water in the pipe 21 being under pressure will enter the tank 17 and exert an upper pressure against the coal oil therein which will float upon said water. The coal oil will thus be discharged into the pipe 25 under pressure. By closing the valve 24 and opening the valve 26, the coal oil will be supplied to the manifold from which it will pass thru the coils 13 and the cross head 14 in which it is heated and converted into a vapor.

A pipe 27 extends from the manifold thru one end of the casing and includes a valve 27'. A T 28 is connected in the pipe and the pipe at its end is coupled to a flexible conductor or hose 29. The valve 27' controls the supply to the T. An upright branch pipe 30 extends from the T and includes a valve 30'. The pipe 30 enters the bottom of and supports an upright receptacle 31 in which lubricating oil or other liquids may be placed. As is shown in Fig. 3, a small pipe 32 is capped into the pipe 30 and enters the top of the receptacle 31. The purpose of this is to admit the gaseous vapor into the upper portion of the receptacle so as to equalize the pressure enabling the lubricating oil to gravitate and be expelled thru the hose 29 and its nozzle 33. A valve 32' is included in the pipe 32 for controlling the passage of the vapor or other fluids to the receptacle 31.

It will be understood that by supplying the coal oil vapor in connection with the lubricating oil, the lubricant will be heated and also this mixture will better penetrate between contacting parts, as for instance the leaves of automobile springs. If desired the coal oil may be eliminated by closing the valve 26 and the small amount of water admitted by opening the valve 24 so that superheated steam may be mixed with the lubricant, or this superheated steam may be used in conjunction with the coal oil. It is obvious that any proportion and combination of these ingredients may be had. The valves provided afford a minute regulation and enable the operator to definitely control the work.

From the opposite end of the manifold a pipe 34 extends thru the casing and connects with a four-way coupling 35, a valve 34' being interposed in the pipe 34. A hose 36 is coupled on the end of the pipe 35 and has a nozzle 37 on its end. This hose may be removed and any other kind of conductor substituted when necessary. A cylindrical tank 38 is supported on legs 39 below the pipe 34 and is adapted for containing paint, enamel etc. A pipe 40 extends from the coupling 35 down into the tank 38 to a point near the bottom thereof as is shown in Fig. 2. A valve 40' is included in the pipe immediately above the tank. A compressed air supply pipe 41 enters the top of the tank and includes a valve 41'. Compressed air or other fluid under pressure admitted to the tank 38 forces the paint to rise in the pipe 40 as is obvious.

A tank 42 is supported on legs 43'' between the tank 17 and the pipe 25 and has a branch pipe 43 extending from its top and connected with the pipe 25 between the valve 26 and the feed pipe 23. The pipe 43 includes a valve 43'. The tank 42 has a drain valve 44 in its bottom and is connected with the pipe 21 by a pipe 45 which includes a valve 45'. The tank 42 is filled with turpentine or other like paint solvent which will float upon water. The valve 24 is closed and the valve 45' opened, whereby the turpentine is expelled thru the pipe 43, the valve 43' being open and the valve 26 being closed. The turpentine will pass thru the feed pipe 23 and into the heating element whereby it will be heated and vaporized if desired. If it is found expedient to include steam the valve 24 may be opened sufficiently to admit a small amount of water so that the steam will be generated in the coils 13.

The valve 27' is closed and the valve 34' is opened, whereby the turpentine vapors will pass thru the coupling 35 and mix with the paint from the pipe 40. This mixture will be driven out thru the hose 36. The nozzle 37 is arranged so as to spray the paint which may be directed upon the surface it is desired to coat. It is obvious that enamel may be applied in the same manner. Of course, it is obvious that if it was not desired to heat the turpentine, the burner 15 would be cut off and the turpentine caused to pass thru the heating element into the pipe 34.

A tank 46 is supported above the coupling 35 by brackets 47 extending upwardly from the tank 38. A branch pipe 48 extends from the coupling to the tank 46 and includes a valve 48'. As is best shown in Fig. 1, a pressure pipe 49 extends from the pipe 48 to the top of the tank 46 and includes a controlling valve 49'. This permits the fluid under pressure to pass into the upper portion of the tank 46 and exert a pressure on the contents thereof. The tank 46 may contain a suitable paint remover which is to be used in connection with steam supplied to the pipe 34, the valve 27' being closed. This paint remover will be discharged into the coupling 35 where it will be mixed with the steam and discharged into the hose 36 which may be of a suitable material to withstand any acid or alkali which may be used. The tank 46 may also be used to hold a liquid soap which may be ejected and mixed with steam for cleaning automobile motors and various parts of automobiles as well as other articles. Of course, when the tank 46 is being used the valve 40' is closed.

It is to be understood that the various tanks and receptacles which have been described may be filled with whatever substance or commodity it is proposed to use.

It is also to be understood that the various valves may be manipulated to give the desired mixture. For instance if it is desired to use coal oil in connection with the soap, it is merely necessary to open the valve 26, whereby the coal oil will be injected into the steam generated in the coils 13. It is obvious that it would be impossible to point out the various mixtures and combinations which may be had, but it is obvious that the apparatus permits of a varied use and almost any desirable mixture may be had.

Various changes in the dimensions and shape as well as modifications may be made, without departing from the spirit of the invention.

What I claim, is:

1. In a device of the type set forth, a fluid receptacle, a water service pipe, means to connect the bottom of the receptacle to the pipe so as to force fluid in the receptacle out of the top of the latter, a valved pipe connected to the top of the receptacle and to the water pipe to conduct the fluid into the water pipe, heating means connected to the water pipe, means to conduct fluid from the heating means, a valve in the water pipe to enable the supply of water to the heating means to be cut-off and to allow fluid from the receptacle to enter the heating means to be vaporized to the exclusion of the water, a second fluid receptacle connected at its bottom to the water service pipe, and a valved pipe connected to the top of the second receptacle and to the valved pipe of the first receptacle whereby upon closing of the valve of the valved pipe of the first receptacle and closing of the water pipe valve and opening of the valve of the valved pipe of the second receptacle fluid from the latter may enter the heating element to be vaporized to the exclusion of the water and of the fluid from the first receptacle.

2. In a device of the type set forth, heating means, a fluid receptacle, a valved pipe connecting the receptacle to the heating means, a pipe connected to the valved pipe and to the top of the receptacle to admit vapor to the receptacle above the level of the fluid therein to force the latter downwardly through the valved pipe, a second fluid receptacle, a water service pipe connected to the bottom of the second receptacle, a valved pipe connected to the heating means and to the water service pipe, and a valved pipe connected to the last named pipe and to the top of the second receptacle, whereby upon operation of the two last named valves steam generated in the heating means and fluid from the second named receptacle may be conjointly or independently caused to commingle with the fluid from the first named receptacle.

In testimony whereof I affix my signature.

FRANK A. BANNON.